United States Patent
Nam

(10) Patent No.: US 7,555,625 B2
(45) Date of Patent: Jun. 30, 2009

(54) MULTI-MEMORY CHIP AND DATA TRANSFER METHOD CAPABLE OF DIRECTLY TRANSFERRING DATA BETWEEN INTERNAL MEMORY DEVICES

(75) Inventor: Kyung-Woo Nam, Seoul (KR)

(73) Assignee: Samsung Electronics Co., Ltd. (KR)

( * ) Notice: Subject to any disclaimer, the term of this patent is extended or adjusted under 35 U.S.C. 154(b) by 234 days.

(21) Appl. No.: 11/260,008

(22) Filed: Oct. 27, 2005

(65) Prior Publication Data

US 2006/0193189 A1     Aug. 31, 2006

(30) Foreign Application Priority Data

Feb. 16, 2005   (KR) ............... 10-2005-0012907

(51) Int. Cl.
   *G06F 13/00* (2006.01)
   *G06F 13/28* (2006.01)
   *G11C 8/10* (2006.01)

(52) U.S. Cl. .................. 711/165; 711/150; 365/233.1

(58) Field of Classification Search ............... None
   See application file for complete search history.

(56) References Cited

U.S. PATENT DOCUMENTS

| 5,031,146 | A | 7/1991 | Umina et al. ........... 365/189.01 |
| 5,412,612 | A | 5/1995 | Oyama ..................... 365/228 |
| 5,436,863 | A * | 7/1995 | Kogure ................... 365/189.04 |
| 6,785,185 | B2 * | 8/2004 | Sumitani et al. ........ 365/230.03 |
| 7,000,846 | B2 * | 2/2006 | Hakushi et al. ............ 235/492 |
| 2001/0053090 | A1 * | 12/2001 | Takata et al. ........... 365/185.08 |
| 2003/0002377 | A1 | 1/2003 | Sumitani et al. ........ 365/230.03 |

FOREIGN PATENT DOCUMENTS

| EP | 1 271 540 A2 | 1/2003 |
| JP | 09-081533 | 3/1997 |
| JP | 2003-15954 | 1/2003 |

OTHER PUBLICATIONS

German Office Action dated Mar. 25, 2009, issued in corresponding International Application No. DE10 2005 062 537. 1-53.
Hans-Peter Messmer, PC-Hardware, 5. Auflage, Addison-Wesley, 1999, pp. 143-150.

\* cited by examiner

*Primary Examiner*—Kevin Verbrugge
*Assistant Examiner*—Eric S Cardwell
(74) *Attorney, Agent, or Firm*—Mills & Onello, LLP

(57) ABSTRACT

A multi-memory chip and data transfer method are capable of directly transferring data between internal memory devices. The multi-memory chip of the present invention includes a first memory device, a second memory device, and a data transmission bus that is shared by the memory devices. Furthermore, the second memory device includes a mode register set for setting an internal transfer mode. In accordance with the data transfer method according to the present invention, the transfer of data between the memory devices included in the multi-memory chip is performed through the data transmission bus shared by the memory devices. Accordingly, the multi-memory chip and the data transfer method can considerably improve data transfer rates between devices, as compared to conventional approaches in which data is transferred to the DMA controller of an external system.

15 Claims, 10 Drawing Sheets

MULTI-MEMORY CHIP AND DATA TRANSFER METHOD CAPABLE OF DIRECTLY TRANSFERRING DATA BETWEEN INTERNAL MEMORY DEVICES

RELATED APPLICATIONS

This patent application claims priority under 35 U.S.C. 119 to Korean Patent Application 10-2005-0012907, filed on Feb. 16, 2005, the entire content of which is incorporated herein by reference.

BACKGROUND OF THE INVENTION

1. Field of the Invention

The present invention relates generally to multi-chip package products and, more particularly, to a multi-memory chip containing two or more memory devices and a method of transferring data between the internal devices of the multi-memory chip.

2. Description of the Related Art

With ever-increasing demand in the semiconductor industry, the trend is toward smaller and more lightweight electronic devices. Accordingly, Multi-Chip Packaging (MCP) technology, in which a plurality of devices are constructed in a common package have become popular. An example of the application of MCP technology is a multi-memory chip, in which a flash memory device and a Static Random Access Memory (SRAM) device are constructed as a single Thin Small Outline Package (TSOP).

In the meantime, each of the memory devices included in the multi-memory chip can independently transfer data with an external system. That is, each memory device can read stored data and output the read data to the external system, and can receive data from the external system and write the received data to memory. In addition, in certain cases, data can be read from one of the memory devices included in the multi-memory chip and written to one or more of the other memory devices.

With reference to FIGS. 1 and 2, the transfer of data between two memory devices 110 and 160 included in a conventional multi-memory chip is performed using a Direct Memory Access (DMA) 220 controller included in an external system 200. That is, during interval T11 of FIG. 3, flash memory 110 is controlled to operate in a read mode and read data are provided to the memory interface 210 of the external system 200. At this time, the flash memory 110 activates a waiting indication signal WAITB providing advance notice of the output of the data, and provides the signal WAITB to the memory interface 210.

During interval T12 of FIG. 3, the data read from the flash memory 110 are stored in the DMA 220. Thereafter, in interval T13 of FIG. 3, when an SRAM 160 is controlled to operate in a write mode, the data read from the flash memory 110 and stored in the DMA 220 are provided to the SRAM 160. At this time, the SRAM 160 activates the waiting indication signal WAITB requesting the transmission of data, and provides the signal WAITB to the memory interface 210.

Meanwhile, in accordance with the conventional multi-memory chip and the method of transferring data between the internal devices of the multi-memory chip illustrated in FIGS. 1 to 3, the transfer of data between the memory devices is also performed through the DMA controller of the external system by transporting the data through the external DMA controller. Accordingly, there is a problem in that the time required for the transfer of data between memory devices can be excessively long.

SUMMARY OF THE INVENTION

Accordingly, the present invention addresses the shortcomings of the conventional approaches described above. An object of the present invention is to provide a multi-memory chip and data transfer method that can reduce the time required for the transfer of data between internal memory devices.

In one aspect, the present invention is directed to a data transfer method for a multi-memory chip. The multi-memory chip has a first memory device and a second memory device that can independently operate in synchronization with clock signals from an external system and that can transmit and receive data to and from the external system while sharing a data transmission bus. The method comprising the steps of: controlling, at an external system, the multi-memory chip to operate in an internal transfer mode the internal transfer mode, driving the second memory device to operate in a writable state while driving the first memory device to operate in a readable state; providing an enabled waiting indication signal from the first memory device to the second memory device in the internal transfer mode, the waiting indication signal providing notice of the reading of data from the first memory device; and receiving the data provided through the data transmission bus from the first memory device at the second memory device after the second memory device has received the activated waiting indication signal; wherein the data are provided to the second memory device from the first memory device through the data transmission bus directly without passing through the external system.

In one embodiment, the waiting indication signal is provided from the first memory device to the second memory device through a waiting signal transmission line that is shared by the first memory device and the second memory device and is connected to the external system.

In another embodiment, the control of the second memory device to operate in the writable state is performed in response to an address provided from the external system through an address bus that is shared by the first memory device and the second memory device.

In another embodiment, the control of the second memory device to operate in the readable state is performed using a mode conversion signal that a mode register set included in the second memory device generates in response to the address provided from the external system.

In another embodiment, enabling the waiting indication signal is delayed in response to a delay in the reading of data from the first memory device.

In another embodiment, the waiting indication signal is disabled in response to an interrupt in the reading of data from the first memory device.

In another embodiment, the waiting indication signal is enabled after being disabled for a period of time in response to an interruption in the reading of data from the first memory device.

In another embodiment, at least one of the first memory device and the second memory device is enabled in response to a chip enable signal, latches a first address before being disabled again, and does not respond to a second and subsequent addresses.

In another aspect, the present invention is directed to a data transfer method for a multi-memory chip. The multi-memory chip has a first memory device and a second memory device that can independently operate in synchronization with clock signals from an external system and that can transmit and receive data to and from the external system while sharing a data transmission bus. The method comprising the steps of:

controlling, at the external system, the first memory device to operate in a readable state; controlling, at the external system, the second memory device to operate in a readable state using a mode register, the mode register being included in the second memory device, while controlling the first memory device to operate in the readable state; and receiving data that are provided from the first memory device through the data transmission bus at the second memory device controlled to operate in the readable state; wherein the data are provided to the second memory device from the first memory device through the data transmission bus directly without passing through the external system.

In another aspect, the present invention is directed to a multi-memory chip comprising: a data transmission bus; and a first memory device and a second memory device that can independently operate in synchronization with clock signals received from an external system and can transmit data to and receive data from the external system while sharing the data transmission bus; wherein the second memory device includes a mode register set for setting an internal transfer mode, the internal transfer mode controlling the second memory device to operate in a writable state while controlling the first memory device to operate in a readable state; wherein the second memory device receives data from the first memory device through the data transmission bus in the internal transfer mode directly without passing through the external system.

In one embodiment, the multi-memory chip further comprises a waiting signal transmission line that is shared by the first memory device and the second memory device and through which the first memory device and the second memory device can respectively provide waiting indication signals to the external system; wherein the second memory device receives the waiting indication signal from the first memory device in the internal transfer mode.

In another embodiment, the second memory device receives data read from the first memory device in response to the waiting indication signal provided from the first memory device.

In another embodiment, the waiting indication signal provided from the first memory device to the second memory device is transferred by the waiting signal transmission line that is shared by the first memory device, the second memory device and the external system.

In another embodiment, at least one of the first memory device and the second memory device is enabled in response to a chip enable signal, latches a first address before being disabled again, and does not respond to a second and subsequent addresses.

In another embodiment, the first memory device is flash memory and the second memory device is Static Random Access Memory (SRAM).

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
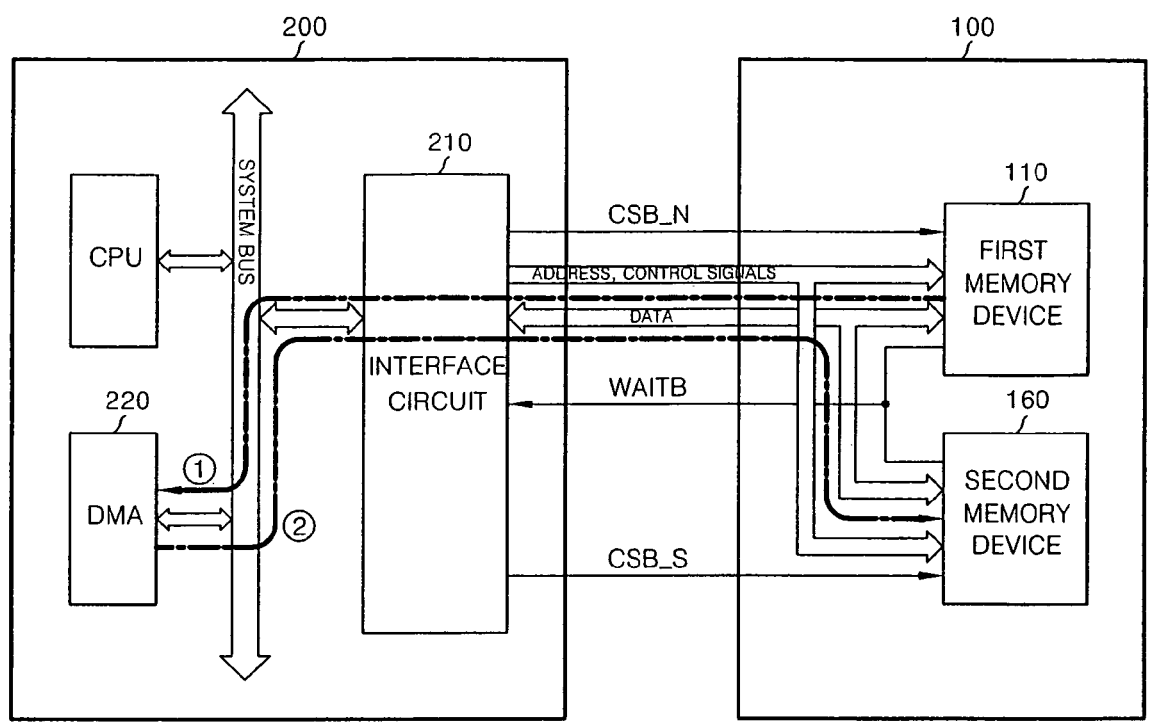
FIG. 1 is a block diagram illustrating a method of transferring data between the internal devices of a conventional multi-memory chip.
Figure 2:
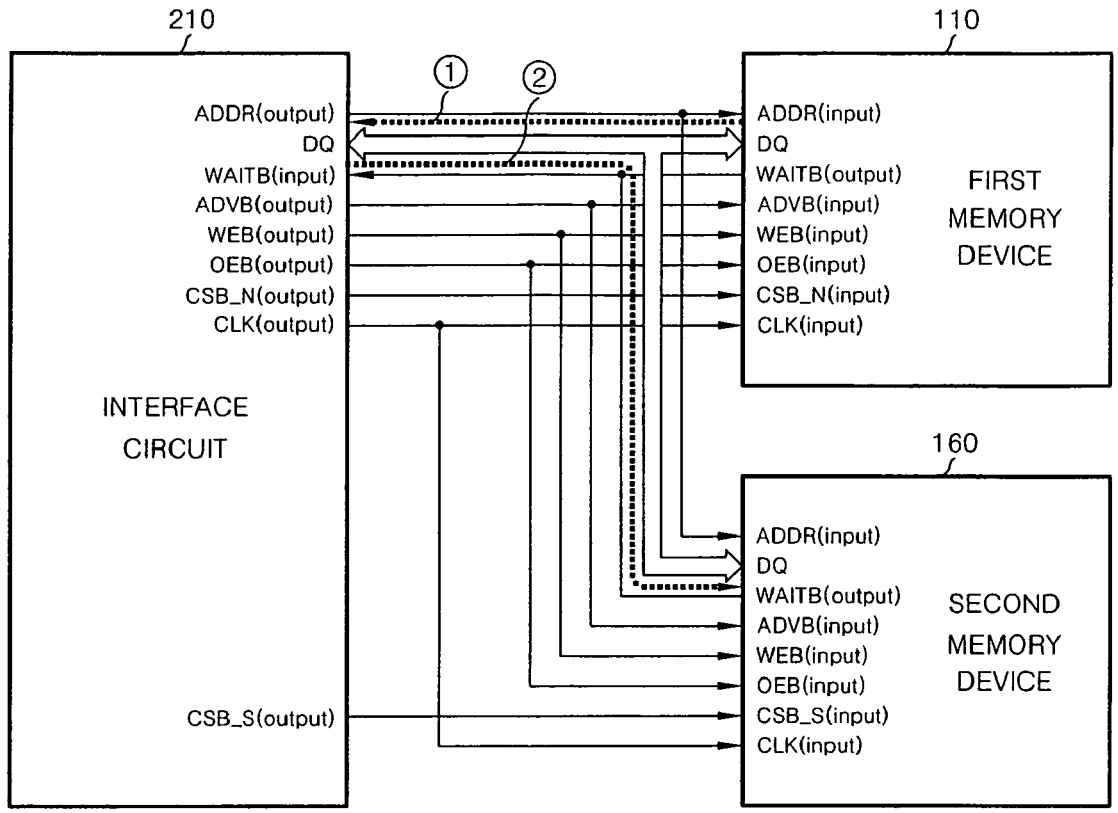
FIG. 2 is a block diagram illustrating the connection of the conventional multi-memory chip to the memory interface of an external system, and the transfer of data.
Figure 3:
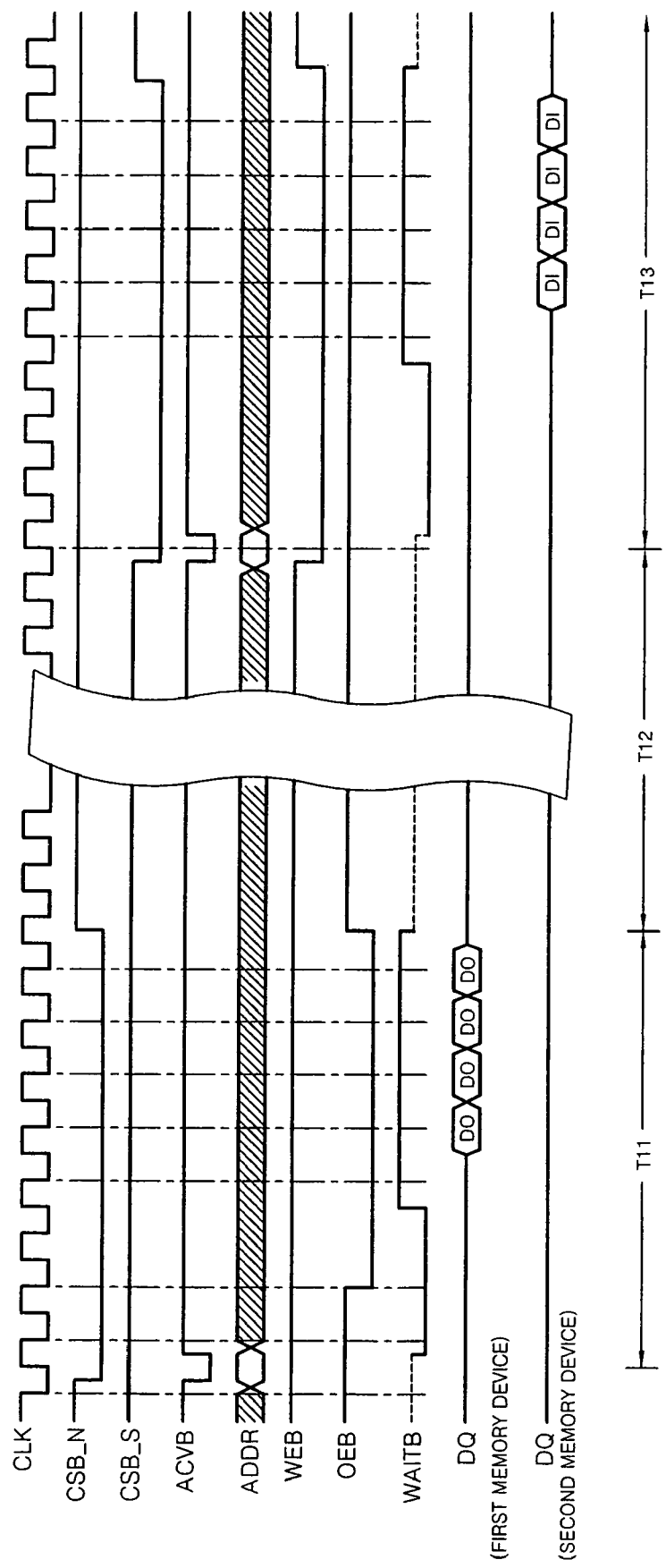
FIG. 3 is a timing diagram of signals used for the transfer of data in the multi-memory chip of FIG. 2.

Reference is now made to the drawings, in which the same reference numerals are used throughout the different drawings to designate the same or similar components. The present invention is described in detail by describing an embodiment of the present invention with reference to the accompanying drawings.

Figure 4:
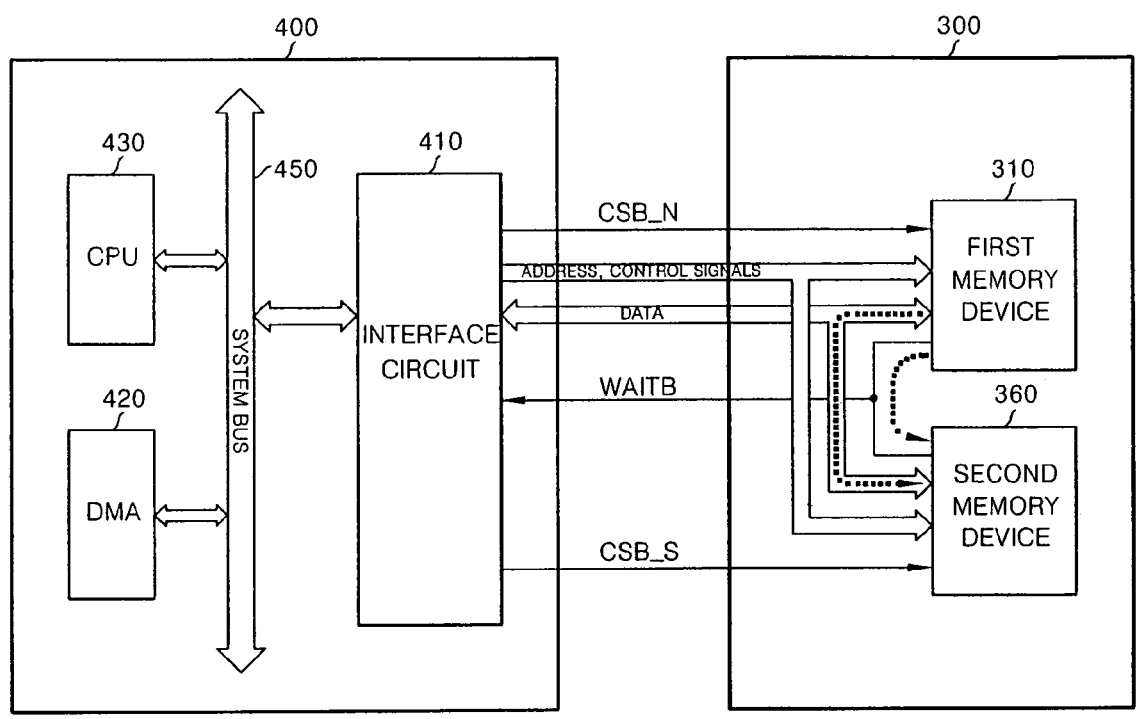
FIG. 4 is a block diagram illustrating a multi-memory chip according to an embodiment of the present invention and an external system interfacing with the multi-memory chip.

FIG. 4 is a block diagram showing a multi-memory chip 300 according to an embodiment of the present invention and an external system 400 interfacing with the multi-memory chip 300. Furthermore, in FIG. 4, data flow between internal devices included in the multi-memory chip 300 are schematically illustrated.

A system and method for reducing the number of pins required for the interface with the external system 400 and the area required for bus routing are applied to a multi-memory chip 300 in accordance with the present invention. That is, different types of first and second memory devices 310 and 360 are included in the multi-memory chip 300. The first memory device 310 and the in second memory device 360 have almost identical interfaces with respect to the external system 400. In the multi-memory chip 300 of the present invention, the direct transmission of data from the first memory device 310 to the second memory device 360 can be performed, which will be described in detail below. In this case, a waiting indication signal WAITB is provided from the first memory device 310 to the second memory device 360.

In the present embodiment, an example of the first memory device 310 is flash memory, and an example of the second memory device 360 is SRAM.

In the external system 400 of FIG. 4, an interface circuit 410 allows the external system 400 to communicate with the multi-memory chip 300. The DMA 420 temporarily stores data, and provides data to the multi-memory chip 300 at the request of the interface circuit 410, as a background process irrespective of CPU 430 commands. The CPU 430 controls the operation of the external system 400. A system bus 450 transmits data and signals between the memory interface 410, the DMA 420 and the CPU 430. The external system 400 of FIG. 4 is illustrated only as an example, it is apparent to those skilled in the art that the external system 400 can be implemented in various forms.

Figure 5:
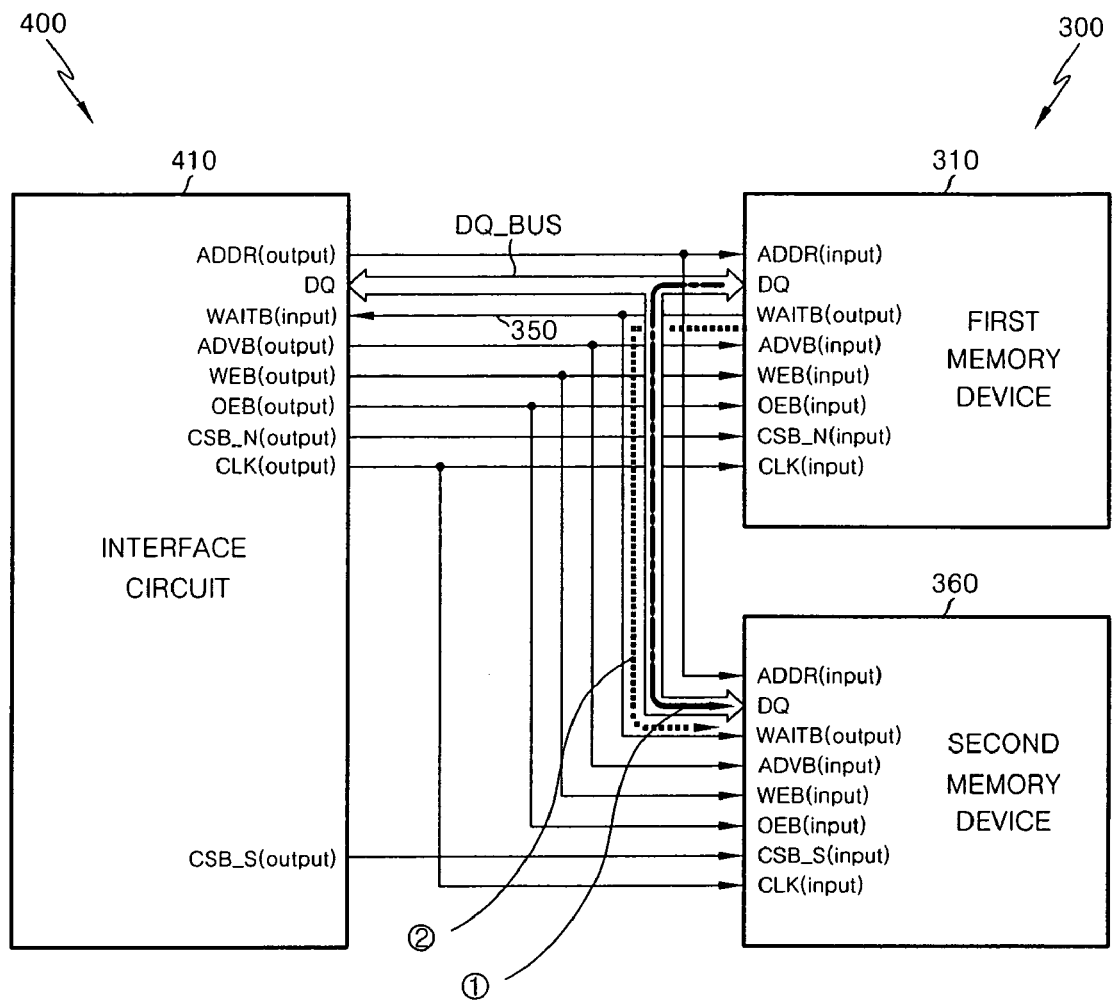
FIG. 5 is a block diagram illustrating the interface between the multi-memory chip and the external system of FIG. 4 in detail.

FIG. 5 is a block diagram illustrating the interface between the multi-memory chip 300 and the external system 400 of FIG. 4 in detail. The first memory device 310 and the second memory device 360 are connected to the interface circuit 410 of the external system 400 while sharing pins and buses for inputting an address ADDR and signals ADVB, WEB, OEB and CLK. The address ADDR is used to specify and select a memory cell included in the memory device 310 or 360. The signal ADVB is used to perform control such that the address ADDR is effectively latched by the memory device 310 or 360. The signal WEB is used to perform control such that data can be written to the memory device 310 or 360. The signal OEB is used to perform control such that data can be read from the memory device 310 or 360. The signal CLK is a clock signal that is used to operate the memory device 310 or 360 of the multi-memory chip 300 while synchronizing the memory device 310 or 360 of the multi-memory chip 300 with the external system 400.

Furthermore, in the multi-memory chip 300 of the present invention, a data transmission bus DQ_BUS for transmitting data that are input and output is also shared. Furthermore, in the multi-memory chip 300 of the present invention, a waiting signal transmission line 350 for transmitting a waiting indication signal WAITB is shared. The waiting indication signal WAITB is generated from the memory device 310 or 360 and is used to provide advance notice of the output of data or request the provision of data from the external system 400.

In the multi-memory chip 300 of the present invention, a pin and a transmission line for a chip selection signal selecting a memory device are separately arranged. The first memory device 310 is enabled in response to a first device selection signal CSB_N, and can independently transmit and receive data to and from the external system 400. The second memory device 360 is enabled in response to a second device selection signal CSB_S, and can independently transmit and receive data to and from the external system 400.

The signals of FIG. 5 are illustrated as an example, by which the present invention is not limited.

Meanwhile, in the multi-memory chip 300 of the present invention, an internal transfer mode, in which the first device selection signal CSB_N and the second device selection signal CSB_S are all controlled to state "L", is produced. In the internal transfer mode, in this example, the first memory device 310 is controlled to a readable state, and the second memory device 360 is controlled to a writable state. In this case, data read from the first memory device 310 are directly provided to the second memory device 360 (refer to ① of FIG. 5). In other words, when data are transferred from the first memory device 310 to the second memory device 360, the data do not pass through the external system 400. At this time, a waiting indication signal WAITB is provided from the first memory device 310 to the second memory device 360 (refer to ② of FIG. 5).

In accordance with the multi-memory chip 300 of the present invention, the time required for the transfer of data between internal devices is considerably reduced. That is, in the conventional multi-memory chip, data are transferred from the first memory device to the DMA of the external system, and are then provided to the second memory device. In contrast, in the multi-memory chip of the present invention, data can be directly provided from the first memory device 310 to the second memory device 360 without passing through the DMA 420 of the external system 400. Accordingly, the time required for the transfer of data between internal devices is considerably reduced.

Figure 6:
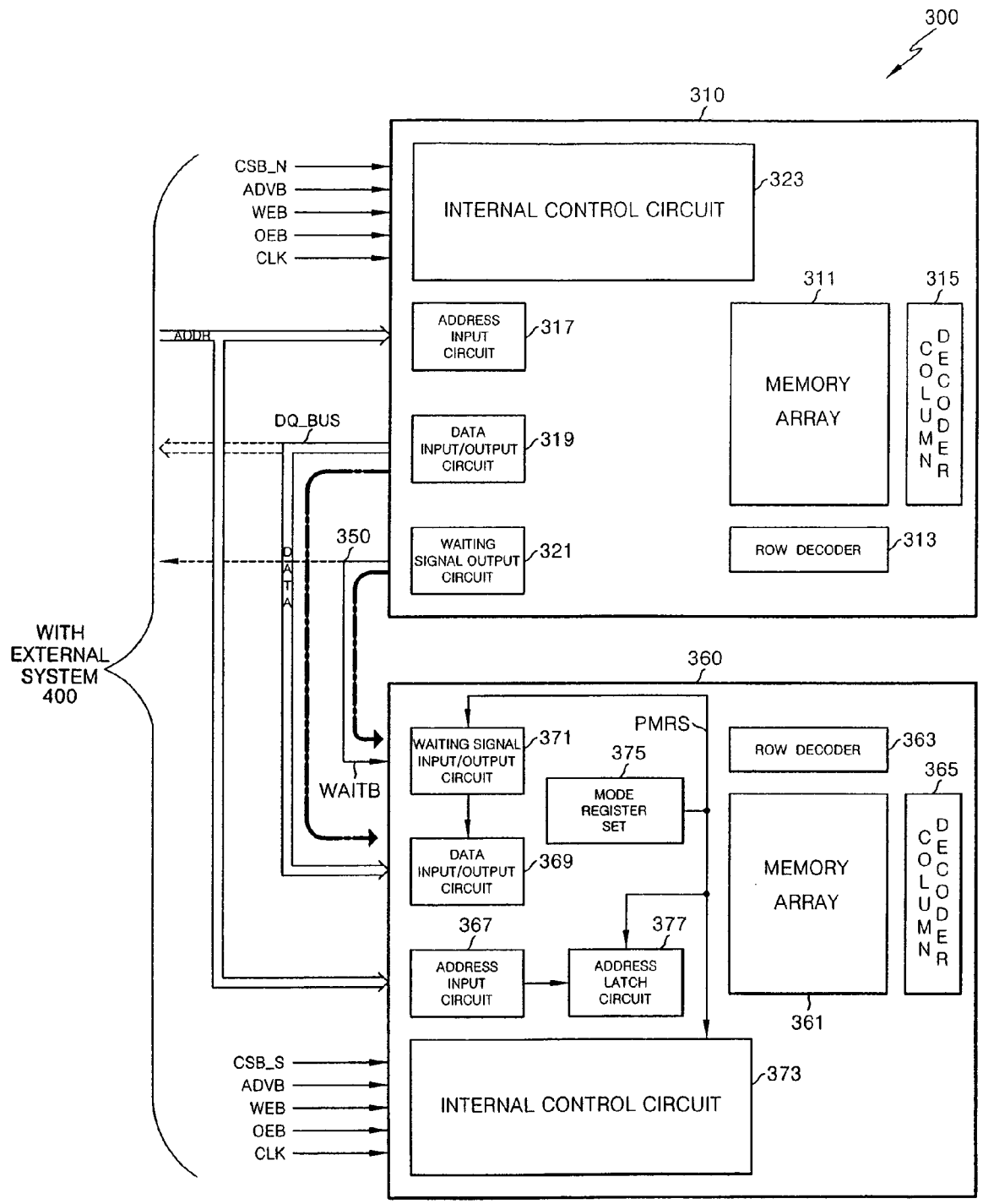
FIG. 6 is a detailed block diagram illustrating the first and second memory devices of the multi-memory chip 300 of FIG. 4.

FIG. 6 is a detailed block diagram illustrating the first and second memory devices 310 and 360 of the multi-memory chip 300 of FIG. 4. The multi-memory chip of the present invention, as shown in FIG. 6, includes a first memory device 310, a second memory device 360 and a data transmission bus DQ_BUS. The first memory device 310 and the second memory device 360 can be respectively synchronized with a clock signal CLK provided from the external system 400 and be independently operated. The first memory device 310 and the second memory device 360 can respectively exchange data with the external system 400 while sharing the data transmission bus DQ_BUS.

The first memory device 310 includes a memory array 311, a row decoder 313, a column decoder 315, an address input circuit 317, a data input/output circuit 319, a waiting signal output circuit 321 and an internal control circuit 323. The memory array 311 includes a plurality of memory cells that are arranged in rows and columns. The row decoder 313 and the column decoder 315 respectively select a row and a column of the memory array 311 corresponding to an input address ADDR. The address input circuit 317 buffers the received address ADDR and provides the address ADDR to the row decoder 313 and the column decoder 315. The data input/output circuit 319 provides data, which are read from the memory array 311, to the data transmission bus DQ_BUS in read and internal transfer modes. The data input/output circuit 319 provides data, which are transmitted via the data transmission bus DQ_BUS, to the memory array 311.

The waiting signal output circuit 321, as described above, provides a waiting indication signal WAITB providing advance notice of the output of data or requesting the provision of data to the external system 400 via the waiting signal transmission line 350. In an internal transfer mode, the waiting indication signal WAITB may be provided from the first memory device 310 to the second memory device 360.

The internal control circuit 323 determines the operation mode of the first memory device 310 in response to signals ADVB, WEB, OEB, CLK and a first device selection signal CSB_N, and generates signals that are used to control operations corresponding to the signals.

Meanwhile, the second memory device 360 includes a memory array 361, a row decoder 363, a column decoder 365, an address input circuit 367, a data input/output circuit 369, a waiting signal input/output circuit 371 and an internal control circuit 373. The memory array 361, row decoder 363, column decoder 365, and address input circuit 367 of the second memory device 360 perform substantially the same functions as the memory array 311, row decoder 313, column decoder 315 and address input circuit 317 of the first memory device 310. Accordingly, in the present specification, detailed descriptions thereof are omitted.

The waiting signal input/output circuit 371 of the second memory device 360 also provides a waiting indication signal WAITB to the external system 400 via the waiting signal transmission line 350, as does the waiting signal output circuit 311 of the first memory device 310. Furthermore, in an internal transfer mode, the waiting signal input/output circuit 371 can input a waiting indication signal WAITB provided from the first memory device 310 via the waiting signal transmission line 350.

The data input/output circuit 369 provides data from the memory array 361 to the external system 400 via the data transmission bus DQ_BUS when operating in a read mode. The data input/output circuit 369 provides data, which are provided from the external system 400 via the transmission bus DQ_BUS, to the memory array 361 when operating in a write mode. Furthermore, the data input/output circuit 369 provides data, which are provided from the first memory device 310 via the data transmission bus DQ_BUS, directly to the memory array 361 of the second memory device 360 when operating in an internal transfer mode.

Preferably, the data input/output circuit 369 is controlled so that it can receive data from the first memory device 310 in response to a waiting indication signal WAITB from the first memory device 310.

Like the internal control circuit 323 of the first memory device 310, the internal control circuit 373 of the second memory device 360 determines the operation mode of the second memory device 360 and generates signals that control various operations, in response to signals ADVB, WEB, OEB and CLK and a second device selection signal CSB_S.

In accordance with an embodiment of the present invention, the second memory device 360 includes a mode register set 375. The mode register set 375 generates a mode conversion signal PMRS in response to a combination of an address ADDR and/or signals ADVB, WEB, OEB and CSB_S. The mode conversion signal PMRS is used to perform control such that the second memory device 360 enters into an internal transfer mode, and the PRMS signal is provided to the waiting signal input/output circuit 371, the internal control circuit 373 and an address latch circuit 377.

In response to the mode conversion signal PMRS, the waiting signal input/output circuit 371 enters a state in which the waiting indication signal WAITB from the first memory device 310 can be input. Furthermore, the internal control circuit 373 controls the second memory device 360 to operate in a writable state in response to the mode conversion signal PMRS. The second memory device 360 is placed in a writable state such that received data can be written thereto.

The address latch circuit 377 is controlled to operate in a first address latch state in response to the mode conversion signal PMRS. In the present specification, the first address latch state refers to a state in which a first address is latched and second or subsequent addresses are not responded to. By the address latch circuit 377, an address latched by the second memory device 360 is maintained even if an address selecting the first memory device 310 is input after the address selecting the second memory device 310 has been latched.

Meanwhile, an address latch circuit for latching only a first address received may optionally be included in the first memory device 310. In this case, the address of the first memory device 310 will be received before the address of the second memory device 360 is input.

Figure 7:
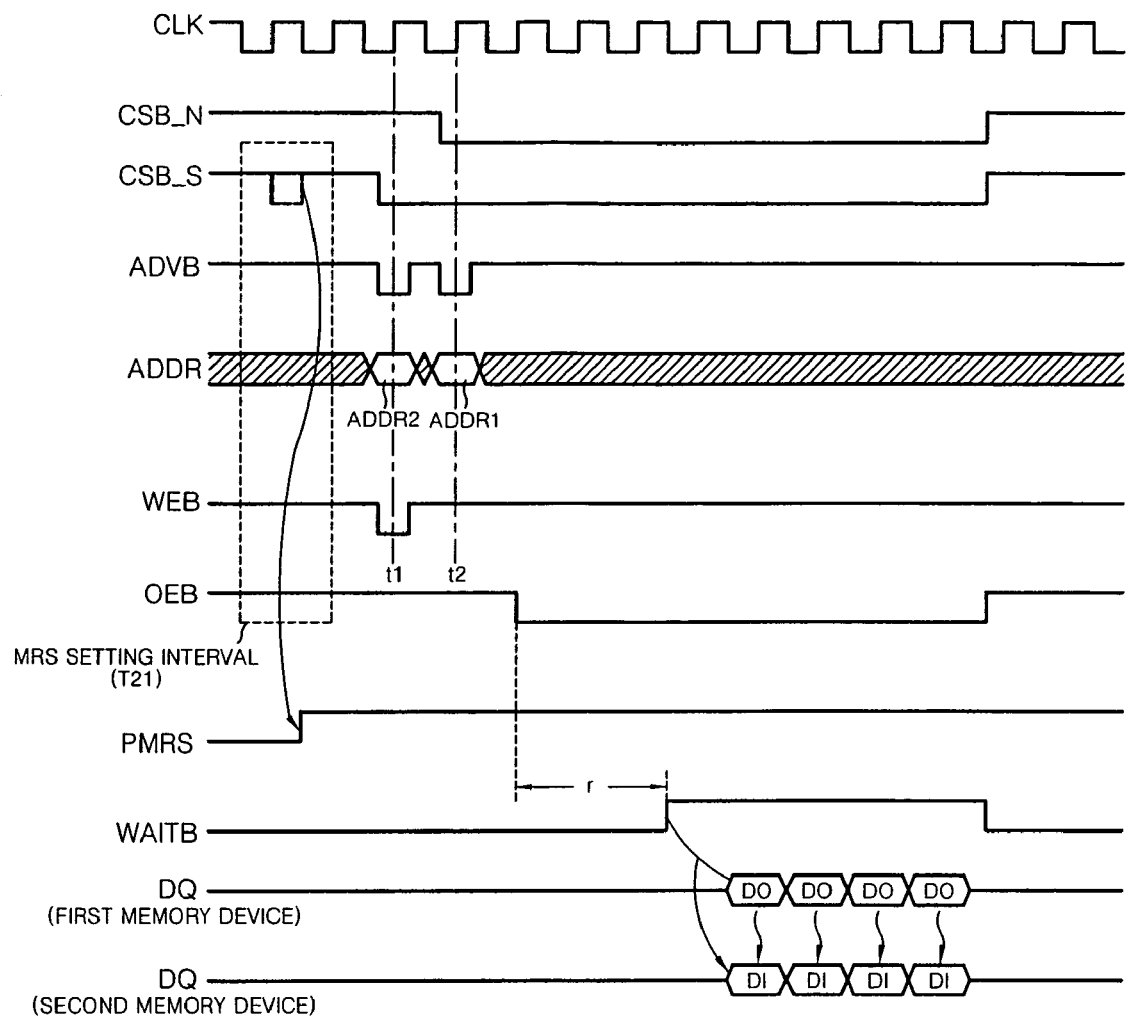
FIG. 7 is a timing diagram of the internal transfer mode of the multi-memory chip according to an embodiment of the present invention.

FIG. 7 is a timing diagram of the operation of the internal transfer mode of the multi-memory chip according to an embodiment of the present invention. First, in a MRS setting interval T21, when the mode register set 375 of the second memory device 360 receives preset signals, the second memory device 360 is caused to operate in an internal transfer mode. In the case of FIG. 7, when a second device selection signal CSB_S is generated in an "L" active pulse form while the signal ADVB remains in state "H", the mode of operation of the second memory device 360 is caused to be changed into an internal transfer mode. At this time, the mode conversion signal PMRS is activated to state "H". The setting of the mode register set 375 may be performed by various methods other than the method illustrated in FIG. 7.

Furthermore, while the second device selection signal CSB_S remains at a state "L", the signal WEB is activated to state "L" (at time t1), so that the second memory device 360 is controlled to operate in a writable state. Thereafter, when the first device selection signal CSB_N becomes a state "L" (at time t2), the signal WEB is controlled to operate at a state "H", so that the first memory device 310 is controlled to operate in a readable state.

At time t1, the signal ADVB is first enabled to state "L", so that the address ADDR2 of the second memory device 360 is received. At time t2, the signal ADVB is enabled to state "L" again, so that the address ADDR1 of the first memory device 310 is received. At this time, the second memory device 360 does not respond to an address that is received at time t2 when the signal ADVB is second enabled to state "L" again.

After time t2, the multi-memory chip enters an internal transfer mode, so that data are transferred from the first memory device 310 to the second memory device 360. The first memory device 310 activates a waiting indication signal WAITB providing advance notice of the output of data, as in a normal data read state. Furthermore, the second memory device 360 enters the state of receiving data in response to the waiting indication signal WAITB from the first memory device 310. Thereafter, data read from the first memory device 310 are transferred and input to the second memory device 360.

In the meanwhile, in an internal transfer mode, a waiting indication signal WAITB provided from the first memory device 310 to the second memory device 360 functions to synchronize the time at which valid data are output from the first memory device 310 with the time at which the data are input to the second memory device 360. After having been activated to a state of "H", the waiting indication signal WAITB is synchronized with the signal CLK and indicates the output of data from the first memory device 310 and the input of data to the second memory device 360.

Figure 8:
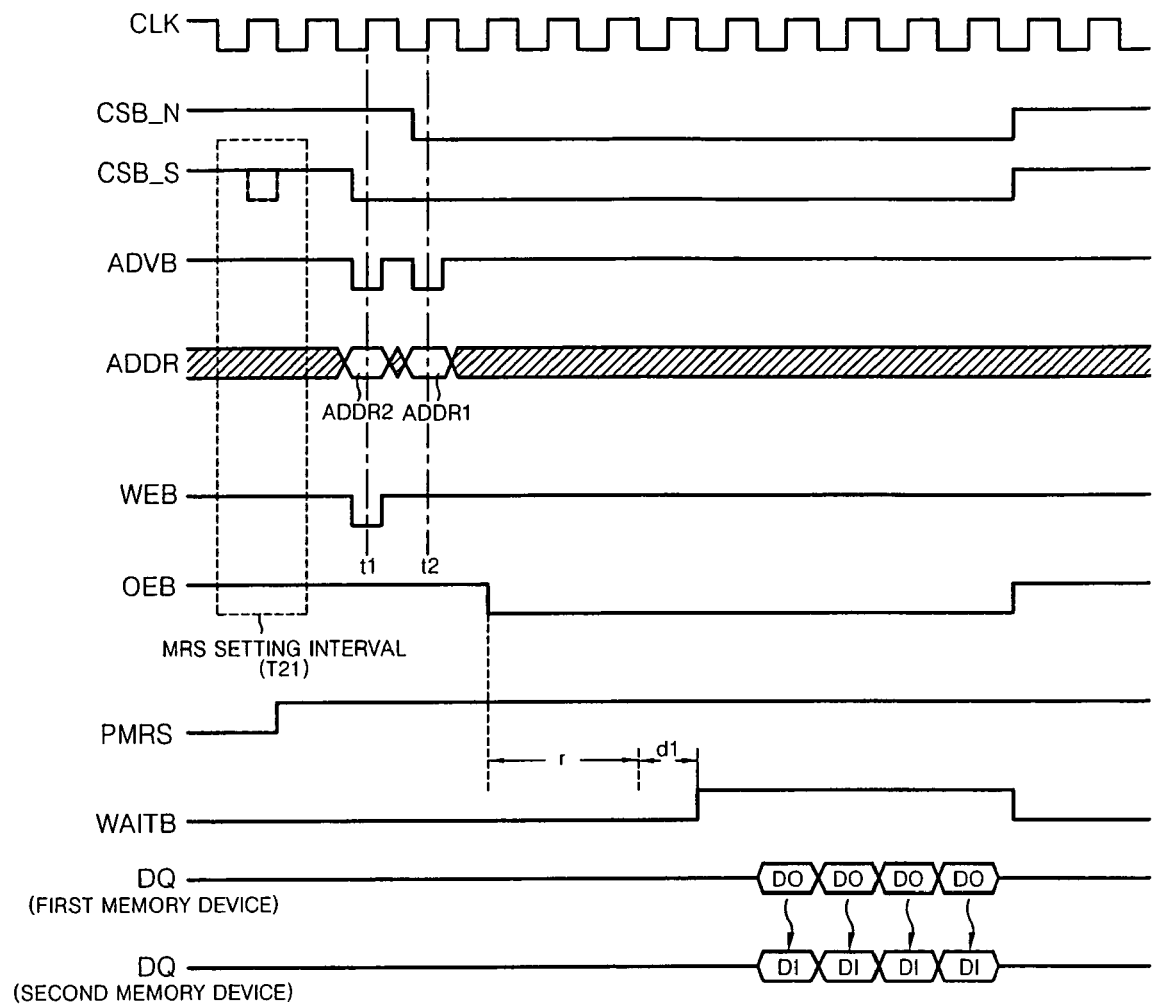
FIG. 8 is a timing diagram of a case where an output of data from the first memory device is delayed in the multi-memory chip of the present invention.

Furthermore, even when the output of data from the first memory device 310 is delayed, the transfer of data between the internal devices of the multi-memory chip of the present invention can be performed without any impediment. FIG. 8 is a timing diagram of the case where the output of data from the first memory device 310 is delayed in the multi-memory chip of the present invention. If, as illustrated in FIG. 8, the time when the availability of output data from the first memory device 310 is delayed by a certain time d1, the time of the activation in the waiting indication signal WAITB is activated is delayed by the same time d1. Accordingly, an operation is performed such that data are input to the second memory device 360 after a delay of the time d1. As a result, the time where data are output from the memory device 310 and the time when data are input to the memory device 360 are delayed to correspond to the same time. Therefore, the transfer of data is performed without any impediment.

Figure 9:
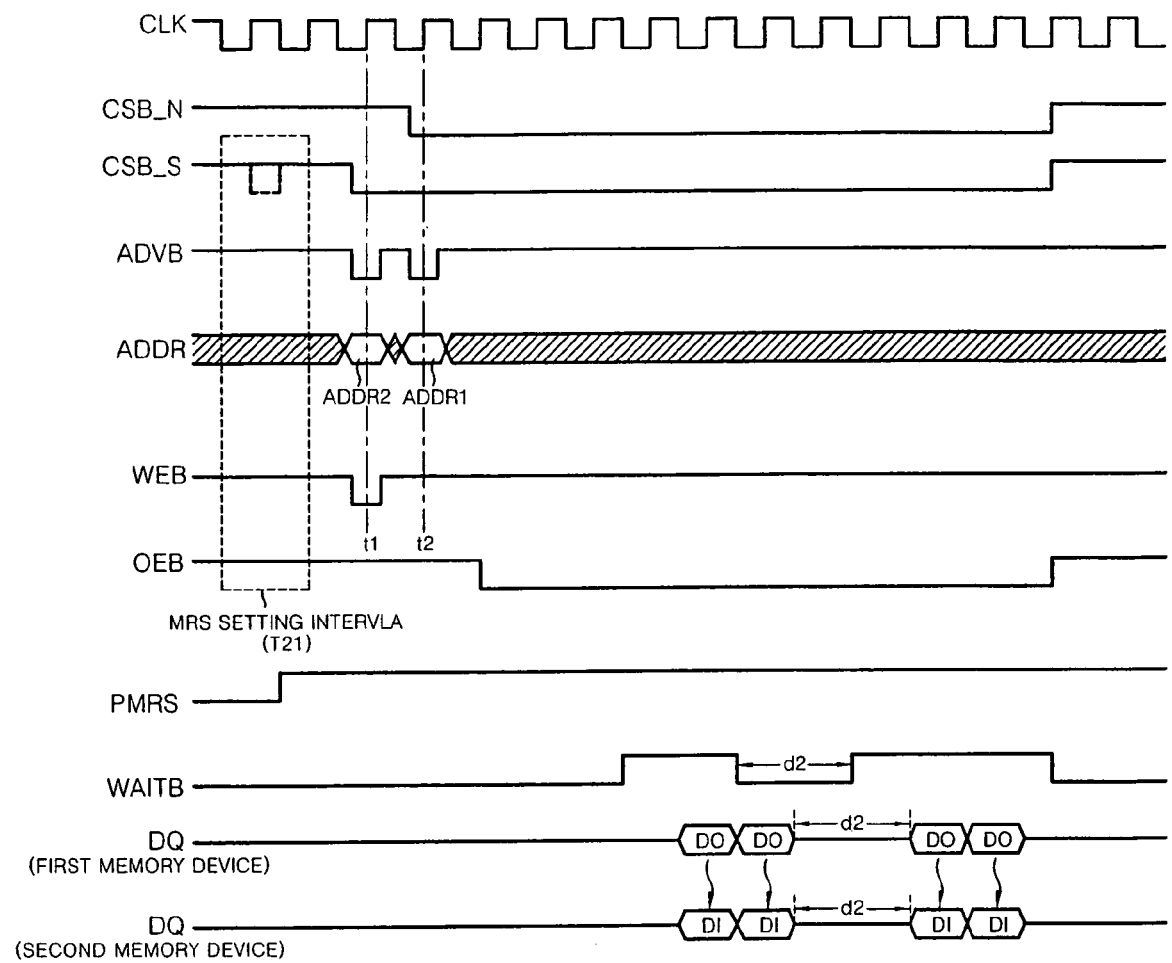
FIG. 9 is a timing diagram of a case where an interruption occurs in the output of data from the first memory device of the multi-memory chip of the present invention.

Furthermore, when an interruption occurs in the output of data from the first memory device 310, the transfer of data between the internal devices of the multi-memory chip of the present invention can be performed without any impediment. FIG. 9 is a timing diagram of the case where an interruption occurs in the output of data from the first memory device 310 of the multi-memory chip of the present invention. When the latencies of the two memory devices 310 and 360 are different or successive addresses pass through a row boundary in a page mode, an interruption may occur in the output of data from the first memory device 310. If, as illustrated in FIG. 9, an interruption continues for time d2 in the output of data from the first memory device 310, a corresponding interruption occurs in the activation of the waiting indication signal WAITB for the time period d2. Accordingly, the transfer of data between the two memory devices 310 and 360 can be performed without any impediment.

Figure 10:
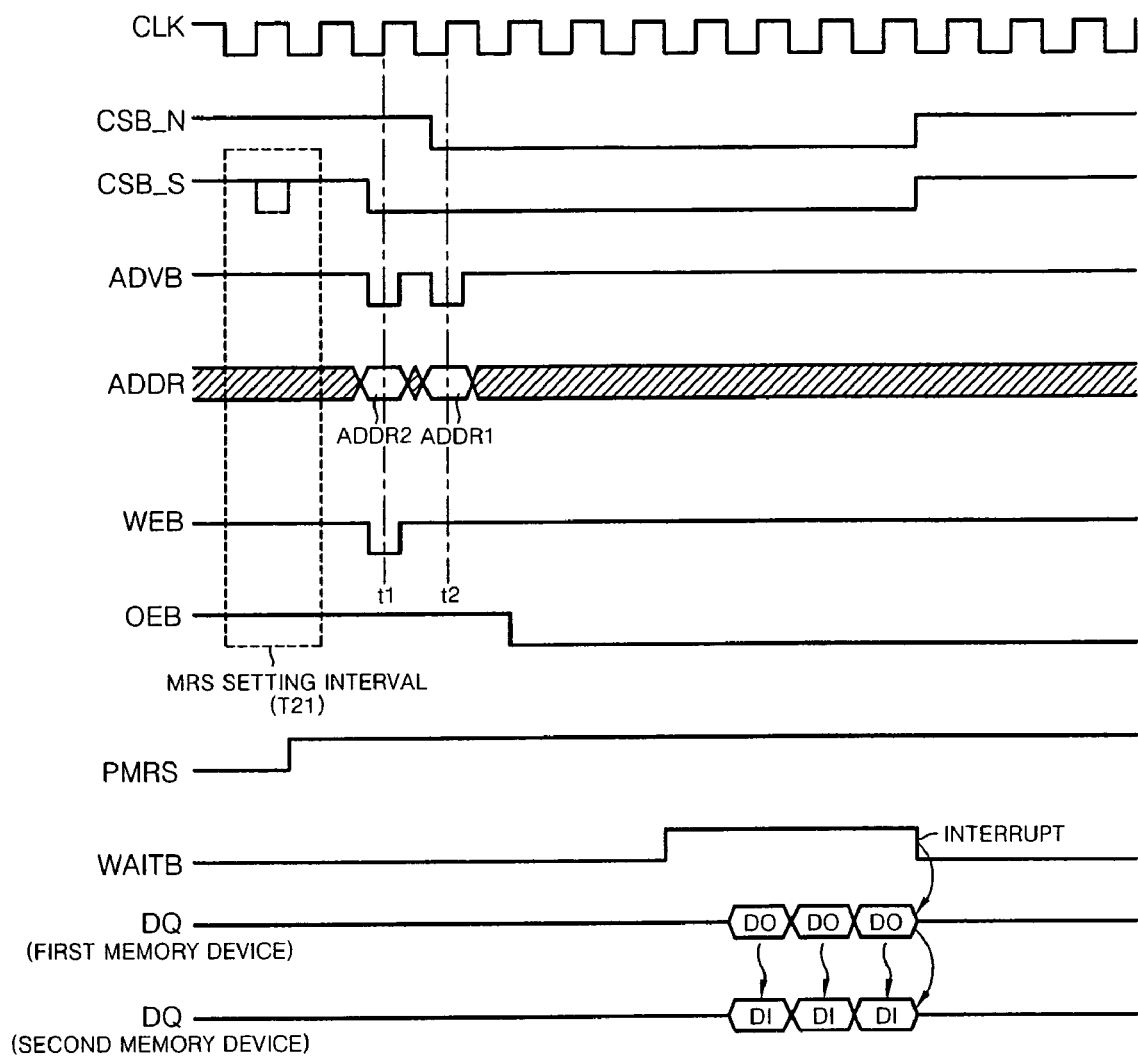
FIG. 10 is a timing diagram of the case where an interrupt occurs in the output of data from the first memory device of the multi-memory chip of the present invention.

Furthermore, even when an interrupt occurs in the output of data from the first memory device 310, the transfer of data between the internal devices of the multi-memory chip of the present invention can be performed without any impediment. FIG. 10 is a timing diagram of the case where an interrupt occurs in the output of data from the first memory device 310 of the multi-memory chip of the present invention. In the case where the interrupt occurs in the output of data from the first memory device, as illustrated in FIG. 10, the waiting indication signal WAITB is disabled to state "L". Accordingly, the second memory device 360 recognizes that data are no longer available for input. As a result, the transfer of data between the two memory devices 310 and 360 is performed without any impediment.

Although the present invention has been described with reference to the embodiment described above with reference to the drawings, the embodiment is only illustrative. Those skilled in the art can understand that various modifications and equivalent embodiments can be derived therefrom. For example, in the present specification and drawings, the embodiment in which data are transferred from one memory device to another memory device has been illustrated and described. However, it is apparent to those skilled in the art that the technical sprit of the present invention can be realized in an embodiment in which data read from one memory device are provided to two or more other memory devices.

As described above, the multi-memory chip of the present invention includes the first memory device, the second memory device, and the data transmission bus that is commonly shared by the memory devices. The second memory device includes the mode register set for setting an internal transfer mode. In accordance with the above-described multi-memory chip and data transfer method according to the present invention, the transfer of data between the internal memory devices is performed via the data transmission line shared by the memory devices. Accordingly, in accordance with the multi-memory chip and data transfer method according to the present invention, data transfer rates can be considerably improved, as compared to the conventional technology of transferring data through the DMA of an external system.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A data transfer method for a multi-memory chip, the multi-memory chip having a first memory device and a second memory device that can independently operate in synchronization with clock signals from an external system and that can transmit and receive data to and from the external system while sharing a data transmission bus, the method comprising:

controlling, at an external system, the multi-memory chip to operate in an internal transfer mode, permitting an exchange of data directly between the first and second memory devices, the internal transfer mode driving the second memory device to operate in a writable state while driving the first memory device to operate in a readable state;

providing an enabled waiting indication signal from the first memory device to the second memory device in the internal transfer mode, the waiting indication signal being generated by the first memory device and providing notice of the reading of data from the first memory device; and receiving the data provided through the data transmission bus from the first memory device at the second memory device after the second memory device has received the activated waiting indication signal;

wherein the data are provided to the second memory device from the first memory device through the data transmission bus directly without passing through the external system.

2. The method as set forth in claim 1, wherein the waiting indication signal is provided from the first memory device to the second memory device through a waiting signal transmission line that is shared by the first memory device and the second memory device and is connected to the external system.

3. The method as set forth in claim 1, wherein the control of the second memory device to operate in the writable state is performed in response to an address provided from the external system through an address bus that is shared by the first memory device and the second memory device.

4. The method as set forth in claim 3, wherein the control of the second memory device to operate in the readable state is performed using a mode conversion signal that a mode register set included in the second memory device generates in response to the address provided from the external system.

5. The method as set forth in claim 1, wherein enabling the waiting indication signal is delayed in response to a delay in the reading of data from the first memory device.

6. The method as set forth in claim 1, wherein the waiting indication signal is disabled in response to an interrupt in the reading of data from the first memory device.

7. The method as set forth in claim 1, wherein the waiting indication signal is enabled after being disabled for a period of time in response to an interruption in the reading of data from the first memory device.

8. The method as set forth in claim 1, wherein at least one of the first memory device and the second memory device is enabled in response to a chip enable signal, latches a first address before being disabled again, and does not respond to a second and subsequent addresses.

9. A data transfer method for a multi-memory chip, the multi-memory chip having a first memory device and a second memory device that can independently operate in synchronization with clock signals from an external system and that can transmit and receive data to and from the external system while sharing a data transmission bus, the method comprising:

controlling, at the external system, the first memory device to operate in a readable state;

controlling, at the external system, the second memory device to operate in a readable state using a mode register, the mode register being included in the second memory device, while controlling the first memory device to operate in the readable state so that data is exchanged directly between the first and second memory devices and so that advance notice of the data from the first memory device is provided from the first memory device to the second memory device; and receiving data that are provided from the first memory device through the data transmission bus at the second memory device controlled to operate in the readable state;

wherein the data are provided to the second memory device from the first memory device through the data transmission bus directly without passing through the external system.

10. A multi-memory chip comprising:

a data transmission bus; and a first memory device and a second memory device that can independently operate in synchronization with clock signals received from an external system and can transmit data to and receive data from the external system while sharing the data transmission bus;

wherein the second memory device includes a mode register set for setting an internal transfer mode, the internal transfer mode controlling the second memory device to operate in a writable state while controlling the first memory device to operate in a readable state; and wherein the second memory device receives data from the first memory device through the data transmission bus in the internal transfer mode directly without passing through the external system, wherein, in the internal transfer mode, the first memory device provides advance notice to the second memory device of the data to be transmitted from the first memory device to the second memory device.

11. The multi-memory chip as set forth in claim 10, further comprising a waiting signal transmission line that is shared by the first memory device and the second memory device and through which the first memory device and the second memory device can respectively provide waiting indication signals to the external system;

wherein the second memory device receives the waiting indication signal from the first memory device in the internal transfer mode.

12. The multi-memory chip as set forth in claim 11, wherein the second memory device receives data read from the first memory device in response to the waiting indication signal provided from the first memory device.

13. The multi-memory chip as set forth in claim 11, wherein the waiting indication signal provided from the first memory device to the second memory device is transferred by the waiting signal transmission line that is shared by the first memory device, the second memory device and the external system.

14. The multi-memory chip as set forth in claim 10, wherein at least one of the first memory device and the second memory-device is enabled in response to a chip enable signal, latches a first address before being disabled again, and does not respond to a second and subsequent addresses.

15. The multi-memory chip as set forth in claim 10, wherein the first memory device is flash memory and the second memory device is Static Random Access Memory (SRAM).

* * * * *